Patented Aug. 16, 1932

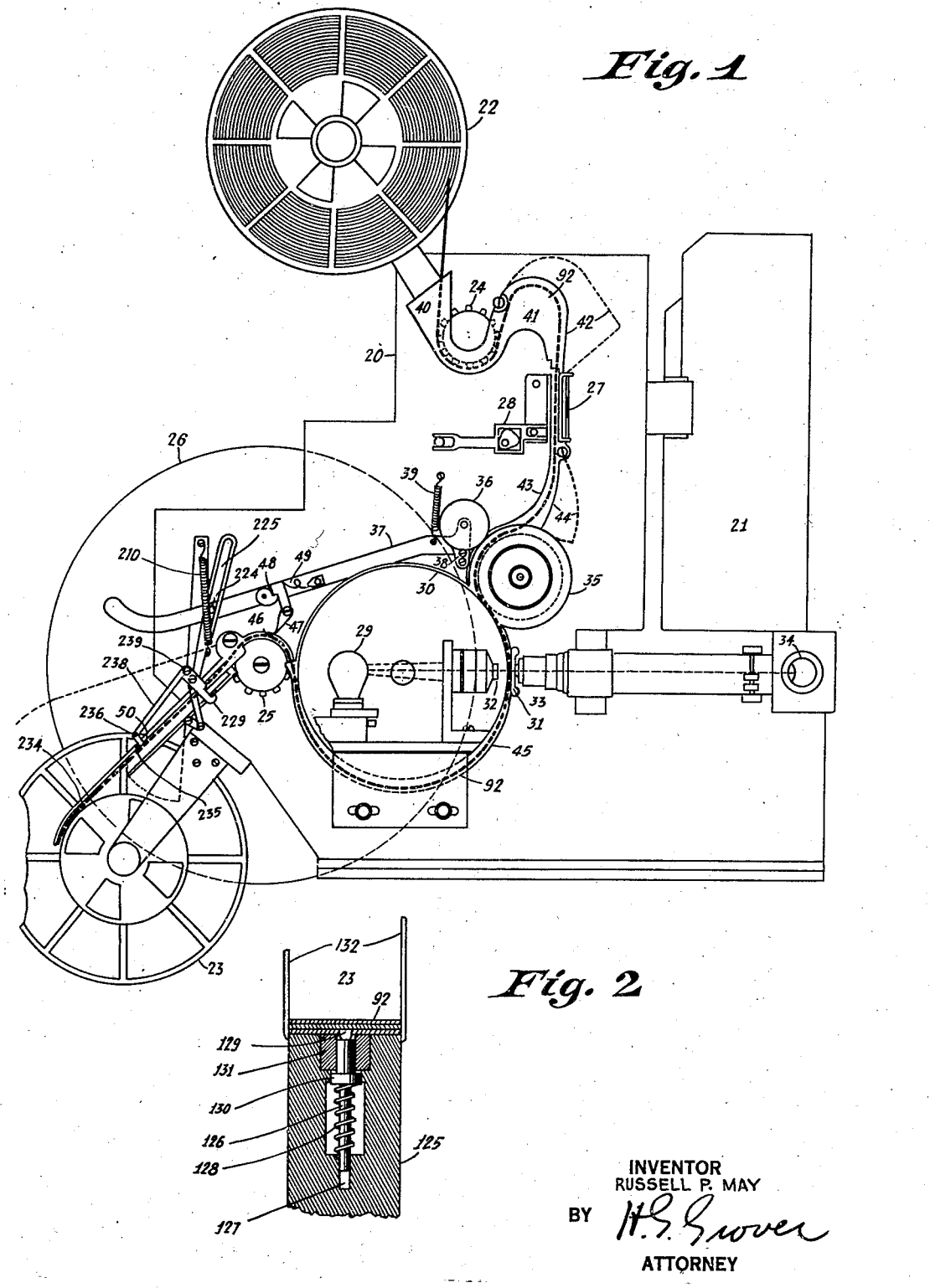

1,871,716

UNITED STATES PATENT OFFICE

RUSSELL P. MAY, OF HADDONFIELD, NEW JERSEY, ASSIGNOR TO RADIO CORPORATION OF AMERICA, A CORPORATION OF DELAWARE

TALKING MOTION PICTURE PROJECTOR

Original application filed September 12, 1929, Serial No. 392,051. Divided and this application filed February 17, 1931. Serial No. 516,359.

In the past, a machine for projecting motion pictures has required many special adjustments and manipulations, and is altogether so complicated that it requires a more or less experienced operator in order to properly operate it. This has been a serious drawback in the development of the home motion picture field, as the difficulty experienced by the home operator often precludes a thorough enjoyment of motion pictures in the home.

With the advent of talking motion pictures, this problem has been increased, because of the fact that a more complicated arrangement is necessary, due to the additional continuous motion of the film past the sound reproducing apparatus.

Various machines have been proposed for accomplishing the threading of a motion picture projector automatically, or more commonly, in a semi-automatic manner, that is, in a manner requiring simple manipulation but not requiring adjustments.

It is, therefore, the primary object of the present invention to produce a machine which is entirely automatic, that is one in which all of the manipulations, as well as the adjustments, are done without the aid of the operator. This is, so far as the inventor is aware, the first talking motion picture machine in which the operation of threading is entirely automatic.

A broader object of this invention is to provide an improved motion picture or talking motion picture projector more particularly of the type adapted for use in the home.

Another object of this invention is to provide a motion picture projector or a talking motion picture projector which may be readily threaded by an inexperiencel operator.

Still another object of this invention is to provide means whereby the film may be connected to a take-up reel automatically, requiring no control on the part of the operator.

A still further object of this invention is to provide a new and improved film take-up reel.

These and additional objects of my invention will become apparent from the following specification taken in conjunction with the accompanying drawing.

In accomplishing my invention, a film guiding channel through which the film is urged by a continuously rotating sprocket, is arranged with certain movable portions so that, after the film has passed through the said channel and the projection is ready to commence, these portions of the channel are automatically moved so as to permit the film to be moved intermittently and to permit the action of film loops.

The film is guided from the lower continuously rotating sprocket to the take-up reel where a hole in the end of the film is caught by a spring pressed plunger in the hub of the reel. A plurality of similar spring-pressed plungers, arranged around the periphery of the drum, are depressed into the hub by the pressure of the film as it surrounds the hub. As the reel rotates, the guide which guided the film into contact with its hub, is caused to move by the increasing amount of film being built up. When this motion has been sufficient, the guide is automatically released and moves, under the pressure of a spring to an inoperative position.

Having thus briefly described my invention, reference is now invited to the accompanying drawing wherein:

Fig. 1 is a general elevation showing the principal elements embodying my invention; and, Fig. 2 is a detail of the take-up reel.

Attention is now particularly invited to Fig. 1, wherein 20 represents the frame of the machine. For furnishing the light for projecting the pictures, there is provided a lamp housing 21 equipped with condensing lenses, lamps, etc., the details of which are well known in the art and form no part of the present invention.

The supply reel for the film is shown at 22 above the frame of the machine, and the take-up reel is shown at 23.

For removing the film from the reel 22 and passing it through the machine, in the threading operation, as well as during running, there is provided a continuously rotating sprocket 24. For pulling the film through the lower part of the machine, and more particularly around the reproducing drum, there is provided a similar continuously rotating sprocket 25. These two sprockets are driven by a common shaft rotated by a motor of any appropriate design. The sprocket 25 is driven through a mechanical filter which will be described more in detail hereinafter. The details of the driving mechanism, except as just noted, constitute no part of the present invention and are therefore not being described.

As part of the driving mechanism of the continuous motion sprocket 25, there is provided a fly-wheel 26 which is directly connected to the shaft of the said continuously rotating sprocket 25, and which is driven by a positively driven grid member through a spring arrangement which is described in my copending application, Serial No. 392,051, filed September 12, 1929.

The picture projector includes the film gate 27, for passing the film in an intermittent motion past which is provided the intermittent motion device 28. The intermittent is driven by the common driving motor in any appropriate manner. The details of the intermittent and its driving means are well known and need not be described herein.

For reproducing the sound recorded upon the film, there is provided a light source 29, mounted in any appropriate manner inside of the sound reproducing drum 30. The light from the source 29 is focussed upon the film 92 at the film gate 31 by means of the lens system 32. For projecting the image of the illuminated film upon the photoelectric cell 34, there is provided an optical system including the objective lens 33. The construction of this optical system is well known and it includes a screen having a slot therein upon which the image of the film is focussed. The light from this slot is focussed upon the photoelectric cell and variations of the light intensity vary the latter's resistance to operate a sound reproducer.

For preventing any effect of the intermittent motion of the film at the picture gate 27 from reaching the film at the sound gate 31, and also for holding the film in contact with the reproducing drum 30, there is provided the damping roller 35 against which the film is pressed by the pressure roller 36. The pressure roller 36 is mounted upon an arm of the threading release operating lever 37, which latter is pivoted at 38 and so arranged as to cause the pressure roller 36 to be pressed against the film by spring 39.

For guiding the film into contact with the upper continuously rotating sprocket 24, there is provided a funnel-shaped guide 40. After passing the sprocket 24 the film is guided through the upper loop guide 41 which includes a movable section 42 which may be moved from the position shown in heavy lines to that shown in dotted lines. The film is thus passed between the separable parts of the picture gate 27 and through the lower loop guide 43 which latter includes a second movable section 44 which may be moved from the position shown in heavy lines to that shown in dotted lines.

For guiding the film around the sound reproducing drum 30, there is provided the guide 45, which it is to be noted is disposed at the lower portion thereof, a greater distance from the surface of the drum than at other portions. This is for the purpose of later permitting an accumulation of the film between the film picture gate 27 and the damping roller 35, as will be explained more in detail hereinafter. For guiding the film from the reproducing drum 30 to and around the continuously rotating sprocket 25, there is provided the guide 46 through an aperture in which projects the releasing trigger 47. The trigger 47, during the threading operation engages the catch 48 on the threading release operating lever 37; it being pressed into engagement with said catch by means of the trigger spring 49.

The film while being passed around sprocket 25, being bent in a curve, has sufficient stiffness to move the trigger 47, and after the lever 37 has been moved by the spring 39 into the operating position there is no longer a pressure by the trigger spring 49 upon the trigger 47, so that the latter does not press upon the film.

For attaching the end of the film to the take-up reel 23, there is provided a take-up mechanism 50 which will be described more in detail hereinafter.

Fig. 2 shows the details of one of a plurality of pins inserted in the hub of the take-up reel 23 of Fig. 1. The take-up reel has a hub 125 in an aperture 127 of which is inserted the spring pressed plunger 126. This plunger is pressed by means of the spring 128 acting against the collar 130 so that its end 129 will project a considerable distance beyond the surface of the hub 125. For retaining the plunger in the hub, there is provided a bushing 131 which limits the amount which the pin 129 may project, by cooperation with the collar 130. One of the several pins 126 will engage a hole cut in the end of the film due to the fact that the peripheral speed of the hub is greater than the linear speed of the end of the film. The second layer of the film 92 will cause the pin to be depressed against the pressure of the spring 128 until it is in the position shown. The remaining pins will be depressed by the film until they are flush with the surface of the hub.

At the lower end of the member 50 is pivotally mounted the curved lower guide member 234. The arm 236 projecting from the lower guide member 234 imparts motion through the link 238 to the arm 239 of the latch member 229, so that when the lower guide member 234 is rotated to the right by the accumulation of film on the take-up reel 23, the latch 229 is released and the members assume the operating positions under the influence of spring 210.

Having thus described my invention, I will now describe its operation.

As shown, the entire threading release mechanism is operated by a single lever 37 which when it is desired to thread the machine is pulled down manually and held there in the position shown in Fig. 1 by the latch 47—48. The trigger 47 has a lever which lies in a central portion of the lower continuously rotating sprocket. As the film is picked up by this sprocket and carried around it, it is also carried under this trigger and, due to the stiffness created by the film being bent around the sprocket, the film is able to raise the trigger and unlatch the lever 37. During the picture projection, the trigger 47 has no spring tension which would hold it against the film, the tension for holding the trigger into position being supplied by the trigger spring 49 mounted on the lever 37 which when in the raised position is not in contact with the trigger 47.

The upper take-up guide 50 is of channel cross-section, and the bottom guide 233 cooperates therewith to direct the film toward the hub of the drum. At a plurality of points around the periphery of the hub of the take-up reel as is described above, are located spring-pressed plungers whose ends project about ⅛ of an inch above the surface of the hub of the drum, and as the film is fed down to the drum and partially around it by the curved portion of the lower take-up guide 234, one of these plungers engages in a hole in the end of the film due to the fact that the drum is driven at a slightly greater speed than the film. The cross-section of this lower take-up guide is so designed as to allow these plungers to pass freely even though the guide is in contact with the hub at its edges. After the film has become engaged with a plunger and is securely caught thereto, the film is automatically put under tension which is sufficient to depress all the succeeding pins and also to cause the second layer of film to depress the pin which caught the end of the film.

After a predetermined amount of the film has been wound up on the reel, its diameter is increased to a degree which causes the lower guide to be lifted up about the hinge 235 and thereby cause the guide mechanism to be unlatched. Then, due to the action of the spring 240, the take-up guides are moved to the position which position permits them to clear the take-up reel.

Various modifications may come within the scope of my invention as defined by the above objects and described in the accompanying specification and it is to be understood that I am not to be limited by the specific embodiment shown and described solely for the purpose of illustration, but by the scope of the invention as set forth in the appended claims.

I claim:

1. A take-up reel for use in an automatic motion picture projector which comprises a hub portion, a plurality of plungers mounted in said hub portion, one of which is adapted to catch a hole in the end of the film being fed thereto and each having a head portion normally adapted to be raised above the surface of said hub, a spring for normally pressing said plunger so that its head protrudes above the surface of said hub, and a bushing for retaining said plunger in said hub whereby a film being accumulated on said hub will press each of said plungers into said hub against the pressure of said springs.

2. A take-up reel for use in an automatic motion picture projector which comprises a hub portion, a plurality of plungers mounted in said hub portion, one of which is adapted to catch a hole in the end of a film being fed thereto, and each having a head portion normally adapted to be raised above the surface of said hub, and a spring for normally pressing said spring-pressed plunger so that its head protrudes above the surface of said hub, whereby a film being accumulated on said hub will press each of said plungers into said hub against the pressure of said springs.

3. A take-up reel for use in an automatic motion picture projector which comprises a hub portion, and a plurality of spring-pressed plungers mounted in said hub portion whereby a film being fed onto said take-up reel will be caught by one of said plungers in a hole in the end therein, and the film accumulated on said hub will press said plungers into said hub.

4. A take-up reel for use in an automatic motion picture projector which comprises a hub portion, and a spring-pressed plunger mounted in said hub portion whereby a film being fed onto said take-up reel will be caught in a hole in the end thereof by said plunger and the next turn of film accumulated on said hub will press said plunger into said hub flush with the top of the first turn of film.

RUSSELL P. MAY.